United States Patent
Strain et al.

(10) Patent No.: US 10,688,420 B2
(45) Date of Patent: Jun. 23, 2020

(54) ENHANCED MOMENTUM CLEANING DEVICE FOR ROTATING BELT SCREENS AND FILTERS

(71) Applicant: NEXOM (U.S.), INC., Grafton, WI (US)

(72) Inventors: Cornelius Strain, Post Falls, ID (US); Eric Skidmore, Harrison, ID (US); Eli Cox, Spokane, WA (US)

(73) Assignee: NEXOM (US), INC., Grafton, WI (US)

( * ) Notice: Subject to any disclaimer, the term of this patent is extended or adjusted under 35 U.S.C. 154(b) by 787 days.

(21) Appl. No.: 14/412,742

(22) PCT Filed: Jul. 8, 2013

(86) PCT No.: PCT/US2013/049607
§ 371 (c)(1),
(2) Date: Jan. 5, 2015

(87) PCT Pub. No.: WO2014/008512
PCT Pub. Date: Jan. 9, 2014

(65) Prior Publication Data
US 2015/0182889 A1    Jul. 2, 2015

Related U.S. Application Data

(60) Provisional application No. 61/668,956, filed on Jul. 6, 2012.

(51) Int. Cl.
*B01D 33/056* (2006.01)
*B01D 33/54* (2006.01)
(Continued)

(52) U.S. Cl.
CPC ........... *B01D 33/056* (2013.01); *B01D 33/04* (2013.01); *B01D 33/44* (2013.01); *B01D 33/466* (2013.01); *B01D 33/54* (2013.01)

(58) Field of Classification Search
CPC ...... B01D 33/056; B01D 33/04; B01D 33/44; B01D 33/466; B01D 33/54; B01D 33/46
(Continued)

(56) References Cited

U.S. PATENT DOCUMENTS 3,222,221 A * 12/1965 Branson .................. B08B 3/123
    134/1
3,408,713 A * 11/1968 Parker .................. A24D 3/0204
    264/168
(Continued)

FOREIGN PATENT DOCUMENTS

DE        9309992 U1    11/1993

OTHER PUBLICATIONS

European Patent Application No. EP13812733, supplementary European Search Report dated Apr. 15, 2016.
(Continued)

*Primary Examiner* — Robert Clemente
*Assistant Examiner* — Akash K Varma
(74) *Attorney, Agent, or Firm* — Borden Ladner Gervais LLP; Gail C. Silver

(57) ABSTRACT

The present technology is directed to fluid filtration systems having enhanced momentum cleaning devices for filter belts and associated systems and methods. In some embodiments, for example, a filtering system includes a fluid channel having a continuous-loop filter belt positioned therein. The filter belt can be configured to trap contaminants while allowing fluid to pass through the filter belt. The system further includes a first cleaning device proximate to the filter belt and a second cleaning device proximate to the filter belt and downstream of the first cleaning device. In particular embodiments the first cleaning device is a scraping blade that presses against the filter belt and the second cleaning
(Continued)

device is one of a wave form, vibrational, or mixed-phase stream energy delivery device.

23 Claims, 7 Drawing Sheets

(51) Int. Cl.
    *B01D 33/44*     (2006.01)
    *B01D 33/46*     (2006.01)
    *B01D 33/04*     (2006.01)

(58) Field of Classification Search
    USPC .................................................... 210/783
    See application file for complete search history.

(56) References Cited

U.S. PATENT DOCUMENTS

| | | | | |
|---|---|---|---|---|
| 4,209,404 A | * | 6/1980 | Yoshida | B01D 25/127 210/225 |
| 5,049,248 A | * | 9/1991 | Muralidhara | B01D 33/04 204/545 |
| 5,209,841 A | * | 5/1993 | Bratten | B01D 25/003 210/107 |
| 5,770,092 A | * | 6/1998 | Sharir | B01D 21/0012 210/107 |
| 6,162,286 A | | 12/2000 | Hasama et al. | |
| 7,101,420 B1 | | 9/2006 | Ellis et al. | |
| 2008/0142737 A1 | | 6/2008 | Hovanec et al. | |
| 2010/0224574 A1 | * | 9/2010 | Youngs | B01D 33/04 210/783 |

OTHER PUBLICATIONS

International Patent Application No. PCT/US2013/049607, International Preliminary Report on Patentability dated Jan. 6, 2015.
International Patent Application No. PCT/US2013/049607, International Search Report and Written Opinion dated Nov. 11, 2013.
Canadian Patent Application No. 2,878,501, Office Action dated Jun. 7, 2019.

* cited by examiner

ENHANCED MOMENTUM CLEANING DEVICE FOR ROTATING BELT SCREENS AND FILTERS

CROSS-REFERENCE TO RELATED APPLICATIONS

The present application claims the benefit of U.S. Provisional Patent Application No. 61/668,956, filed Jul. 6, 2012. The foregoing application is incorporated herein by reference in its entirety. Further, components and features of embodiments disclosed in the application incorporated by reference may be combined with various components and features disclosed and claimed in the present application.

TECHNICAL FIELD

The present technology relates generally to fluid filtration systems. In particular, several embodiments are directed toward enhanced momentum cleaning devices for rotating belt screens and filters associated systems and methods.

BACKGROUND

Purified water is used in many applications, including the chemical, power, medical and pharmaceutical industries, as well as for human consumption. Typically, prior to use, water is treated to reduce the level of contaminants to acceptable limits. Treatment techniques include physical processes such as filtration, sedimentation, and distillation; biological processes such as slow sand filters or activated sludge; chemical processes such as flocculation and chlorination; and the use of electromagnetic radiation such as ultraviolet light.

Physical filtration systems are used to separate solids from fluids by interposing a medium (e.g., a mesh or screen) through which only the fluid can pass. Undesirable particles larger than the openings in the mesh or screen are retained while the fluid is purified. In water treatment applications, for example, contaminants from wastewater such as stormwater runoff, sediment, heavy metals, organic compounds, animal waste, and oil and grease must be sufficiently removed prior to reuse.

Traditional continuous loop rotating belt screens and filters often fail in applications of high organic content, specifically fats, oils, and greases. This failure is at least partially due to low motive force cleaning technology that allows the continuous loop screen to become plugged. Without an effective cleaning device, the liquid filtration systems that integrate these filtering screens fail regularly. These technologies are therefore of limited usefulness in applications of high solids greater than 100 mg/l and situations where the solids may be sticky and include fats, oils, and greases.

DETAILED DESCRIPTION

Figure 1A:
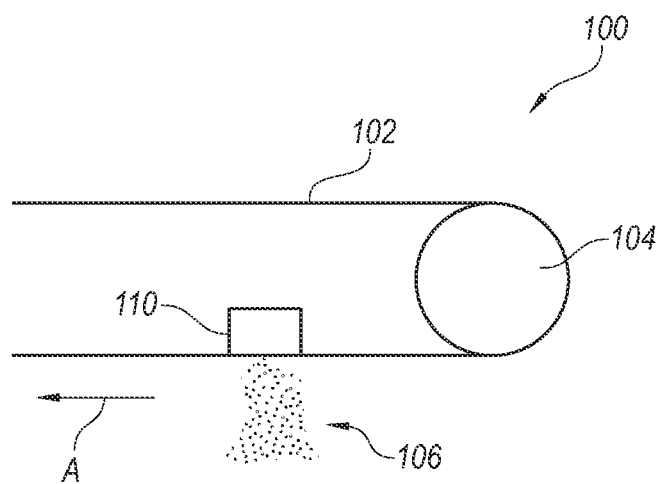
FIG. 1A is a partially schematic sectional illustration of a fluid filtration system configured in accordance with embodiments of the technology.

The present technology is directed to fluid filtration systems having enhanced momentum cleaning devices for filter belts and associated systems and methods. In some embodiments, for example, a filtering system includes a fluid channel having a continuous-loop filter belt positioned therein. The filter belt can be configured to trap contaminants while allowing fluid to pass through the filter belt. The system further includes a first cleaning device proximate to the filter belt and a second cleaning device proximate to the filter belt and downstream of the first cleaning device. In particular embodiments the first cleaning device is a scraping blade that presses against the filter belt and the second cleaning device is one of a wave form, vibrational, or pressurized mixed-phase energy delivery device. In further embodiments, at least one of the first or second cleaning devices comprises a water wash. In some embodiments, the system can further include a contaminant collection system configured to receive contaminants dislodged from the filter belt by the first and/or second cleaning devices.

In further embodiments of the technology, a filtering apparatus can include a chamber having an inlet to a fluid flow pathway. A filter belt can be interposed in the fluid flow pathway, where the filter belt is configured to trap contaminants while allowing fluid to pass from the inlet along the fluid flow pathway. The apparatus can further include a cleaning device positioned adjacent to the filter belt and configured to deliver a wave form energy to the filter belt. In some embodiments, the wave form energy is at least one of sonic, ultrasonic, ultraviolet, microwave, or a combination thereof. In further embodiments, the wave form energy is mechanically-imparted vibrational energy. The wave form energy can be continuously or periodically imparted on the filter belt. In some embodiments, the cleaning device is configured to deliver energy in a direction generally perpendicular to a direction of filter belt movement.

In still further embodiments of the technology, a method of filtering fluid includes inletting contaminated fluid into a fluid flow pathway. The method further includes passing the fluid through a filter belt, thereby trapping contaminants from the contaminated fluid. The method also includes delivering at least one of waveform, vibrational, or mixed-phase stream energy to the filter belt, thereby dislodging at least some of the trapped contaminants from the filter belt. Some embodiments of the method can include containing or rerouting the contaminants after the dislodging. In some embodiments, delivering at least one of waveform, vibrational, or mixed-phase stream energy to the filter belt comprises delivering at least one of sonic, ultrasonic, ultraviolet, or microwave energy to the filter belt. In some embodiments, delivering the energy to the filter belt comprises delivering energy in a direction generally perpendicular to the filter belt. The method can further include delivering continuous or periodic energy to the filter belt.

In further embodiments of the technology, a filtering system includes a chamber having an inlet to a fluid flow pathway. A movable filter belt can be interposed in the fluid flow pathway, where the filter belt is configured to trap contaminants while allowing fluid to pass from the inlet along the fluid flow pathway. A cleaning device can be positioned adjacent to the filter belt and can comprise a scraper configured to interface with the filter belt as the filter belt moves. In some embodiments, the system further includes a spring coupled to the cleaning device and configured to maintain contact between the scraper and the filter belt as the filter belt moves. The system can further include a second cleaning device, such as a water spray bar, downstream of the first cleaning device. Such a water spray bat can deliver periodic or continuous water spray to the filter belt. In particular embodiments, the system can be used to dislodge fat, oil, and grease from the filter belt.

Specific details of several embodiments of the technology are described below with reference to FIGS. 1A-8. Other details describing well-known structures and systems often associated with fluid filtration systems have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1A-8.

FIG. 1A is a partially schematic sectional illustration of a fluid filtration system 100 configured in accordance with embodiments of the technology. The filtration system 100 comprises a fluid channel having a filter belt 102 interposed therein. The filtration system 100 can be used to process and clean various fluids, such as water having suspended solids therein, wastewater, industrial process waste, and other similar fluid treatment streams.

In some embodiments, the filter belt 102 can be an integrated endless or continuous looped filtering belt, such as a mesh screen or filter, for removing or reducing the level of suspended solids in the fluid while allowing fluid to pass therethrough. The filter belt 102 can pass over (i.e., rotate around) a series of rollers 104 that are configured to compose a mounting structure for the belt. In some embodiments, the rollers can hold and maintain the filter belt 104 at a perpendicular or diagonal incline from horizontal. In the illustrated embodiment, the filter belt 102 can move in a direction of arrow A.

The system 100 further includes a cleaning device 110 positioned proximate to (e.g., adjacent to or spaced apart from) the filter belt 102. In various embodiments, the cleaning device 110 can deliver at least one of wave form or mechanical energy to the filter belt 102 to release debris 106, particulate and/or liquids from the filter belt 102, thereby cleaning the filter belt 102. In particular embodiments, the motive force generated by the cleaning device 110 can remove inorganic and organic solids, fats, oils, and greases from the filter belt 102.

In some embodiments, the wave form energy can be at least one of sonic, ultrasonic, ultraviolet, microwave, or a combination thereof. In some embodiments, the cleaning device 110 can dislodge and drive material off of the filter belt 102 without the use of water or air. In further embodiments, the wave form energy can be mechanically-imparted vibrational or otherwise dynamic energy, such as energy driven by a vibrational motor or a vibrational spray bar.

As will be described in further detail below, in some embodiments the cleaning device 110 can deliver dynamic energy from a mixed-phase stream, such as a pressurized combination of gas and liquid. In other embodiments, the cleaning device 100 can deliver a single phase substance or other combinations of phases or materials. In particular embodiments, the cleaning device 110 includes at least one of an injector or nozzle to deliver a stream to the filter belt 102.

In various embodiments, the cleaning device 110 can deliver energy continuously, intermittently (e.g., step-wise), on a pre-set schedule, or as-needed. In some embodiments, the cleaning device 110 can deliver energy in a direction generally perpendicular to a direction of filter belt movement A. According to further aspects of the technology, the cleaning device 110 (or multiple cleaning devices) can deliver various forms of wave and/or mechanical energy concurrently, in sequence, or in a predetermined pattern to provide optimal cleaning.

Figure 1B:
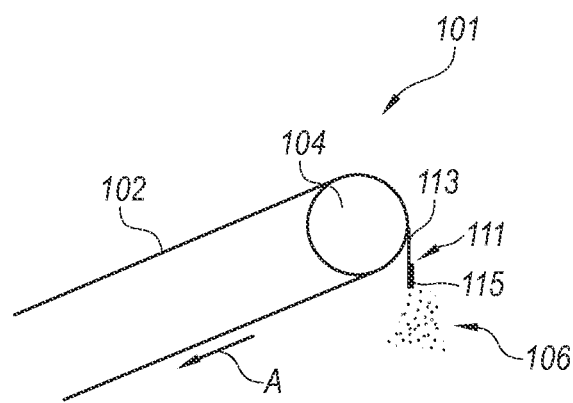
FIG. 1B is a partially schematic sectional illustration of a fluid filtration system configured in accordance with further embodiments of the technology.

FIG. 1B is a partially schematic sectional illustration of a fluid filtration system 101 configured in accordance with further embodiments of the technology. The fluid filtration system 101 includes several features generally similar to the fluid filtration system 100 described above with reference to FIG. 1A, including the filter belt 102 positioned around the roller 104. The system 101 further includes a cleaning device comprising a scraping device 111 having a blade 113 adjacent to the filter belt 102. The blade 113 can be any beveled, tapered, sharp, semi-sharp, flat, sharp-edged, or other suitable structure to interface with the filter belt 102 and scrape or loosen matted sludge, particulate, or other debris 106 from the filter belt 102 as the filter belt 102 moves (i.e., rotates about the roller 104) past the blade 113. The blade 113 can use the momentum of the filter belt 113 in motion to peel, lift, and/or remove the solids from the filter belt 102 for discharge or collection. In some embodiments, the blade 113 comprises a rubber, plastic, or silicone material, but can be other materials in further embodiments.

The scraping device 111 can further include a blade support 115 or backing stiffener capable of providing structural support to the blade 113. As will be described in further detail below with reference to FIG. 2, the scraping device 111 can be used alone or in combination with secondary or tertiary (or more) cleaning devices (such as a spray bar). Further, while the scraping device 111 is illustrated as interfacing with the filter belt 102 as the belt rounds the roller 104, in further embodiments the scraping device 111 or multiple scraping devices can be located at alternate or additional position(s) upstream or downstream with reference to the filter belt's rotational movement direction A.

Figure 2:
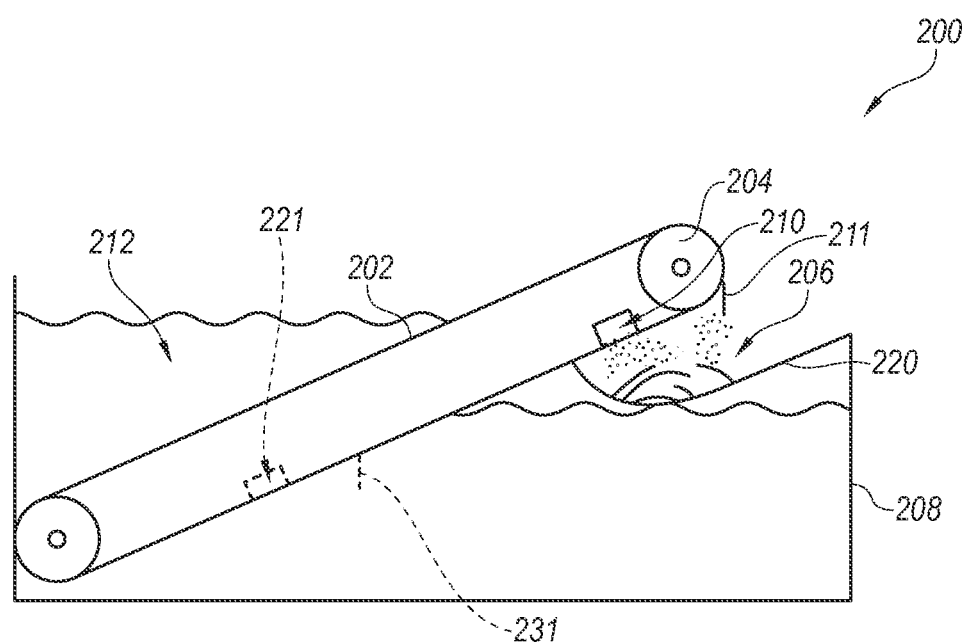
FIG. 2 is a front sectional view of a fluid filtration system configured in accordance with embodiments of the technology.

FIG. 2 is a front sectional view of a fluid filtration system 200 configured in accordance with embodiments of the technology. The filtration system 200 includes several features generally similar to the filtration systems 100, 101 described above with reference to FIGS. 1A and 1B. For example, the system 200 includes an endless-loop filter belt 202 wrapped around a mounting structure comprising a plurality of rollers 204. In some embodiments, the filter belt 204 is positioned in a fluid flow channel or enclosure 208 containing fluid such as wastewater 212.

A first cleaning device 210 can be positioned proximate to the filter belt 202 and can deliver wave form or mechanical energy to the filter belt 202 to release particulate 206 therefrom as described with reference to FIG. 1A. The system 200 can further include a second cleaning device 211 positioned proximate or adjacent to the filter belt 202 and can provide scraping force against the moving filter belt 202 as described above with reference to FIG. 1B. In further embodiments, the first and second cleaning devices 210, 211 can be positioned in the same or other locations with respect to one another and with respect to the filter belt 202. For example, in some embodiments, the second cleaning device 211 is positioned downstream of the first cleaning device 210 or the first and/or second cleaning devices can be positioned at least partially below the fluid level in the enclosure 208.

In still further embodiments, there can be any number or combination of types of cleaning devices. For example, there can be one or multiple wave form, mechanical, or mixed-phase cleaning devices, one or multiple scraping-type cleaning devices, and/or one or multiple other types of cleaning devices, such as a cleaning device that delivers a water wash (at cold, warm, hot, or other temperature), a water/chemical wash, a chemical wash, or other type of cleaning device. In the illustrated embodiment, for example, an optional second wave form, mechanical, or mixed-phase cleaning device 221 and an optional second scraping device 231 are shown in broken line. In some embodiments, different types of cleaning devices (e.g., a wave form device and a scraping device) can alternate along the filter belt 202. In still further embodiments, there can be multiple of a single type of cleaning device in succession. In a particular embodiment, a scraping-type cleaning device can be combined with a periodic or continuous hot water wash cleaning device.

The system 200 can further include a contaminant collection system 220 configured to receive contaminants 206 dislodged from the filter belt 204 by the first and second cleaning devices 210, 211. In the illustrated embodiment, for example, the contaminant collection system 220 comprises a contaminants receiver. In further embodiments, the contaminant collection system 220 can comprise other types of solids/debris handling systems, such as a contaminant diversion/disposal system, a dewatering auger, a sieve, etc.

Figure 3:
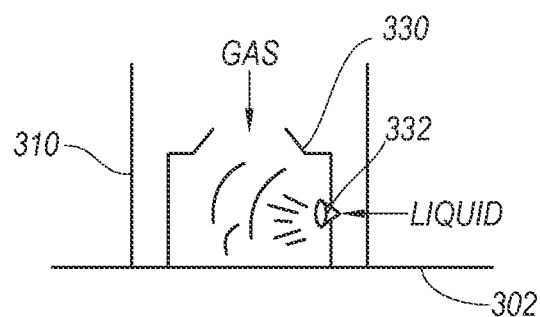
FIG. 3 is a front sectional view of a cleaning device configured in accordance with embodiments of the technology.

FIG. 3 is a front sectional view of a cleaning device 310 configured in accordance with embodiments of the technology. The cleaning device 310 can be used with any filtering system such as those described above with reference to FIGS. 1A-2. The cleaning device 310 is positioned proximate to (e.g., perpendicularly adjacent to) a filter belt 302. The cleaning device 310 comprises a mixed-phase stream delivery device. For example, in the illustrated embodiment, the cleaning device 310 includes a mixing chamber 330 for mixing incoming liquid and gas components. In still further embodiments, the mixed-phase stream comprises components other than gas and liquid.

In the illustrated embodiment, the liquid component is introduced to the mixing chamber via a nozzle 332 or injector. In further embodiments, other phase components can be introduced to the mixing chamber 330 by a nozzle or injector or can be introduced via an open inlet (e.g., without a nozzle or injector). In various embodiments, the mixed phase is introduced to or directed to the filter belt 302 via an open inlet or an injector or nozzle.

Figure 4:
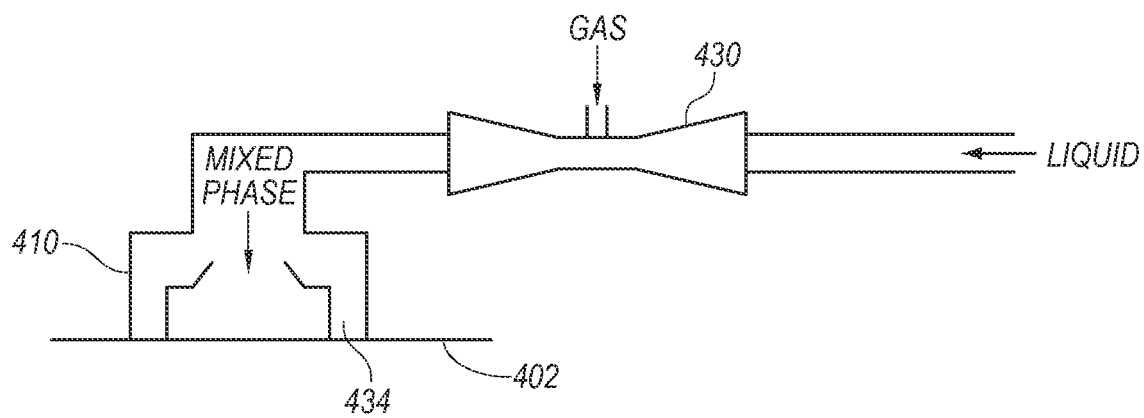
FIG. 4 is a front sectional view of a cleaning device configured in accordance with embodiments of the technology.

FIG. 4 is a front sectional view of a cleaning device 410 configured in accordance with embodiments of the technology. The cleaning device 410 has several features generally similar to those described above with reference to FIG. 3. For example, the cleaning device 410 is positioned proximate to a filter belt 402 and includes a mixing chamber 430 for mixing phase components. In the illustrated embodiment, the mixing chamber 430 comprises an injector for mixing gas and liquid components and passing along the mixed phase stream toward the filter belt 402.

The mixed phase stream is delivered to the filter belt 402 between sidewalls 434. The sidewalls 434 can direct the mixed phase stream to the filter belt 402 to avoid errant stream loss and improve particulate removal from the filter belt 402. In further embodiments, other types of sidewalls or channeling devices can be used to direct the mixed stream, or the sidewalls 434 can be absent altogether.

Figure 5:
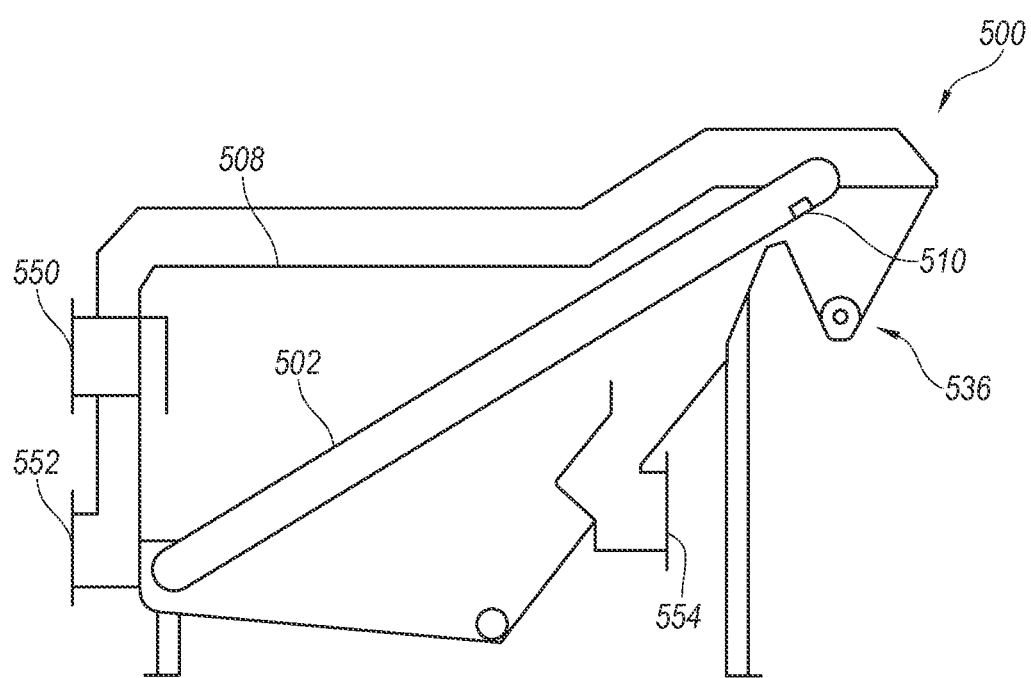
FIG. 5 is a front sectional view of a fluid filtration system configured in accordance with embodiments of the technology.

FIG. 5 is a front sectional view of a fluid filtration system 500 configured in accordance with embodiments of the technology. The fluid filtration system 500 includes several features generally similar to those described above with reference to FIGS. 1A-2. For example, the system 500 includes a filter belt 502 positioned in an enclosure 508. In some embodiments, the system 500 comprises a cartridge-mounted cleaning device, where the filter belt 502 is mounted on a roller framework that can be removable from the enclosure 508. In some embodiments, the enclosure 508 comprises a fluid channel having a fluid inlet 550, a fluid outlet 554, and an overflow trough 552.

FIG. 5 illustrates an example placement of a cleaning device 510 in the system 500. More specifically, the cleaning device 510 is positioned adjacent to the filter belt 502 and proximate to a solids handling system 536. In various embodiments, the solids handling system 536 can comprise any of filters, sieves, dewatering augers, particulate diversion systems, sludge cleanouts, etc. The position of the solids handling system 536 proximate to (e.g., under) the cleaning device 510 can be advantageous, as the particulate removed from the filter belt 502 can be immediately collected and removed from the fluid in the system 500. The cleaning device 510 can be any of the types of cleaning devices described herein, and can be positioned at alternate or additional locations along the filter belt 502 in further embodiments.

Figure 6:
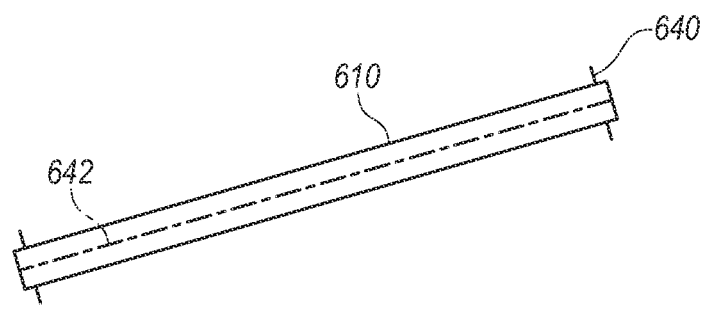
FIG. 6 is a top view of a cleaning device configured in accordance with embodiments of the technology.

FIG. 6 is a top view of a cleaning device 610 configured in accordance with embodiments of the technology. In some embodiments, the cleaning device 610 can be removably mounted in a filtration system such as that described above with reference to FIG. 5. In further embodiments, the cleaning device 610 is permanently mounted in a filtration system. In the illustrated embodiment, the cleaning device 610 comprises a support bar having fasteners, such as mounting brackets 640, coupled thereto. The mounting brackets 640 can attach the cleaning device 610 to a cartridge framework, rollers, enclosure structure, or other component in a filtration system. The cleaning device 610 can include slits 642, nozzles, slots, etc. for channeling and delivery of the motive force needed for cleaning.

Figure 7:
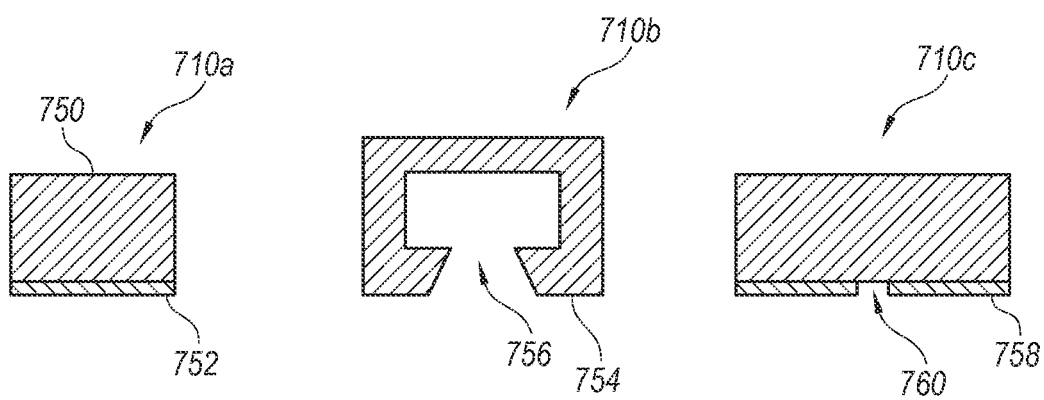
FIG. 7 is a series of front sectional views of cleaning devices configured in accordance with embodiments of the technology.

FIG. 7 is a series of front sectional views of cleaning devices 710a-710c (collectively cleaning devices 710) configured in accordance with embodiments of the technology. The cleaning devices 710 can include several features generally similar to the various embodiments described above. For example, the cleaning devices 710 can have various geometries compatible with the filtration systems described above. The geometry of the bar-type cleaning devices 710 can be selected depending on the source or type of motive force being applied for cleaning a continuous loop mesh belt.

The cleaning device 710a can be a solid extrusion 750 or fabrication with a contact surface 752. In some embodiments, the cleaning device 710a can be used with mechanical equipment, such as a vibration motor, for imparting vibratory motive force.

The cleaning device 710b can be a chambered assembly 754 having a slot 756, hole, or nozzle therein. The slot 756 can provide an exit pathway from the chamber. In some embodiments, the cleaning device 710b can be used to deliver momentum from a mixed phase stream to a filter belt.

The cleaning device 710c can include a contact surface 758 having a slit 760, perforation, or nozzle therein. In some embodiments, the slit 760 can have a geometry specific to a type of wave form energy utilized. For example, the size and geometry of the slit 760 can be selected to optimize the delivery of sonic, ultrasonic, UV energy, etc.

Figure 8:
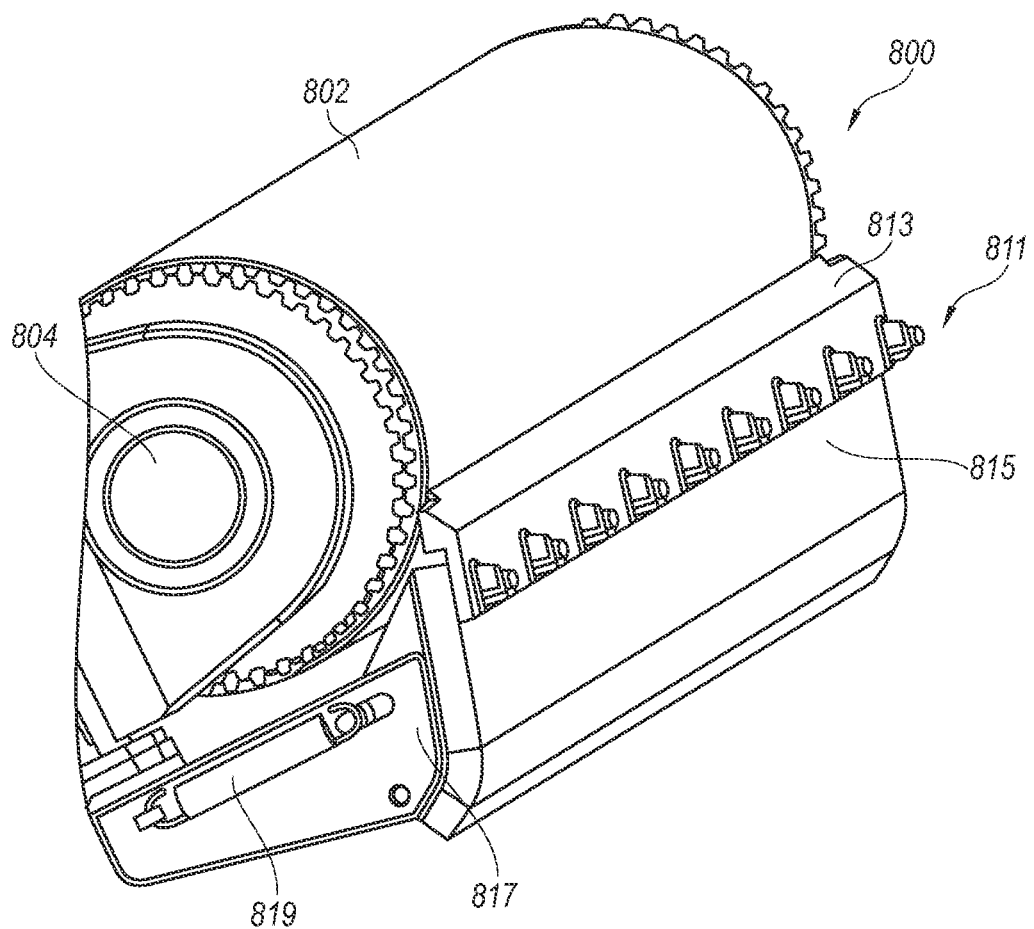
FIG. 8 is an isometric view of a portion fluid filtration system configured in accordance with embodiments of the technology.

FIG. 8 is an isometric view of a portion fluid filtration system 800 configured in accordance with embodiments of the technology. The fluid filtration system 800 includes a scraping device 811 generally similar to the scraping device 111 described above with reference to FIG. 1B. For example, the scraping device 811 includes a blade 813 adjacent to a filter belt 802. The blade 813 can be any beveled, tapered, sharp, semi-sharp, flat, sharp-edged, or other suitable structure to interface with the filter belt 802 and scrape or loosen matted sludge, particulate, or other debris from the filter belt 802 as the filter belt 802 moves (i.e., rotates about a roller 804) past the blade 813. The blade 813 can use the momentum of the filter belt 813 in motion to peel, lift, and/or remove the solids from then belt for discharge or collection. In some embodiments, the blade 813 comprises a rubber, plastic, or silicone material, but can be other materials in further embodiments.

The scraping device 811 can further include a blade support 815 or backing stiffener capable of providing structural support to the blade 813. The blade 813 or blade support 815 can be part of or coupled to a larger assembly 817 attached to an enclosure, a filter belt cartridge, the roller 804, or other structure in a fluid pathway to maintain a position of the scraping device 811 in the fluid pathway. The blade 813, blade support 815, assembly 817, or other features described herein can be coupled to one another with any suitable removable, adjustable, or fixed fastener.

In some embodiments, the blade 813, blade support 815, and/or assembly 817 are coupled to a tension spring 819. The tension spring can provide a compression force on the blade 813 to press or hold the blade 813 in consistent pressured contact with the filter belt 802 for removing solids. In further embodiments, the scraping device 811 can include more or fewer springs to maintain suitable contact between the blade 813 and the filter belt 802.

As described above, the blade 813 can be used alone or in combination with a secondary or tertiary (or more) cleaning devices (such as a spray bar). Further, while the blade 813 is illustrated as interfacing with the filter belt 802 as the belt rounds the roller 804, in further embodiments one or more blades 813 can be located at alternate or additional positions upstream or downstream with reference to the direction of the filter belt's rotation.

The present technology offers several advantages over traditional filtering systems. The technology can be an assembly integrated into a rotating continuous loop filter or screening system to impart higher levels of momentum than currently available to single phase cleaning systems incorporated into liquid and water treatment processes. For example, the embodiments described herein can provide a greater motive force for discharge of particulate, fats, oils, and greases, thereby reducing and eliminating plugging of the continuous loop filter belt sieve. Additionally, traditional filters can have process failure due to liquid jets and nozzles plugging. In contrast, the present technology provides a system that can eliminate the need for constrictive orifices, thereby eliminating plugging within the cleaning system and enhancing overall performance.

The order in which the above systems and methods are described is not intended to be construed as a limitation, and any number of the described features and steps can be combined in any order. Furthermore, the technology described herein can be implemented in any suitable hardware, software, firmware, or combination thereof such that a computing device can implement the technology. In one case, a method is stored on a computer-readable storage media, such as RAM, hard drive, optical disc, etc., as a set of instructions such that execution by a computing device causes the computing device to perform the method.

From the foregoing, it will be appreciated that specific embodiments of the technology have been described herein for purposes of illustration, but that various modifications may be made without deviating from the disclosure. For example, while various attributes of the fluid flow or the filtering apparatus are designated as "upper", "lower", "left", "right", "upwardly-facing", "downward", etc., these terms are used only for purposes of explaining the accompanying drawings. For example, in some embodiments, an inlet may be at a lower height than an outlet and/or fluids may be filtered upwards through a filter mesh such that gravity assists in keeping contaminants from piercing an overhead filter. In still further embodiments, the filtration systems may include additional features, such as overflow chambers, fluid routing systems, or additional flow paths. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A filtering apparatus, comprising:
   a chamber having an inlet to a fluid flow pathway;
   a filter belt interposed in the fluid flow pathway, wherein the filter belt is configured to trap contaminants while allowing fluid to pass from the inlet along the fluid flow pathway; and
   a cleaning device positioned adjacent to the filter belt and configured to deliver a wave form energy to the filter belt,
   wherein the wave form energy is delivered without the use of air or water, and the wave form energy is at least one of sonic, ultrasonic, ultraviolet, microwave, or a combination thereof.

2. The filtering apparatus of claim 1 wherein the wave form energy is mechanically-imparted vibrational energy.

3. The filtering apparatus of claim 1 wherein the cleaning device is configured to continuously deliver wave form energy.

4. The filtering apparatus of claim 1 wherein the filter belt comprises a mesh filter.

5. The filtering apparatus of claim 1 wherein the filter belt comprises a continuous loop filter belt.

6. The filtering apparatus of claim 1 wherein the cleaning device is configured to deliver energy in a direction perpendicular to a direction of filter belt movement.

7. A filtering system for filtering fluid having contaminants therein, the filtering system comprising:
 a fluid channel having a continuous-loop filter belt positioned therein, wherein the filter belt is configured to trap contaminants while allowing fluid to pass through the filter belt; a first cleaning device proximate to the filter belt; and
 a second cleaning device proximate to the filter belt and downstream of the first cleaning device,
 wherein at least one of the first cleaning device or second cleaning device comprises a pressurized mixed-phase stream delivery device, the pressurized mixed-phase stream delivery device having an enclosed mixing chamber including a gas inlet and a liquid inlet for mixing a gas component from the gas inlet and a liquid component from the liquid inlet of a mixed-phase stream delivered by the pressurized mixed-phase stream delivery device.

8. The filtering system of claim 7 wherein at least one of the first cleaning device or second cleaning device comprises a wave form delivery device, and wherein the wave form comprises at least one of sonic, ultrasonic, ultraviolet, microwave, or a combination thereof.

9. The filtering system of claim 7 wherein at least one of the first cleaning device or second cleaning device comprises a vibrational energy delivery device.

10. The filtering system of claim 7 wherein at least one of the first cleaning device or second cleaning device comprises a scraping blade.

11. The filtering system of claim 7 wherein the first cleaning device comprises a scraping blade and the second cleaning device comprises the pressurized mixed-phase stream delivery device.

12. The filtering system of claim 7 wherein at least one of the first cleaning device or second cleaning device is configured to deliver energy in a direction perpendicular to a direction of filter belt movement.

13. The filtering system of claim 7, further comprising a contaminant collection system configured to receive contaminants dislodged from the filter belt by the first and second cleaning devices.

14. A method of filtering fluid, the method comprising:
 inletting contaminated fluid into a fluid flow pathway;
 passing the contaminated fluid through a filter belt, thereby trapping contaminants from the contaminated fluid; and
 delivering at least one of a) waveform energy without the use of air or water in addition to the contaminated fluid, the wave form energy is at least one of sonic, ultrasonic, ultraviolet, microwave, or a combination thereof, or b) mixed-phase stream energy to the filter belt delivered by a pressurized mixed-phase stream delivery device having an enclosed mixing chamber including a gas inlet and a liquid inlet for mixing a gas component from the gas inlet and a liquid component from the liquid inlet or c) energy from a vibrational spray bar, thereby dislodging at least some of the trapped contaminants from the filter belt.

15. The method of claim 14 wherein delivering at least one of waveform or mixed-phase stream energy to the filter belt comprises delivering energy in a direction perpendicular to the filter belt.

16. The method of claim 14, further comprising containing or rerouting the contaminants after the dislodging.

17. The method of claim 14 wherein delivering at least one of waveform or mixed-phase stream energy to the filter belt comprises delivering continuous energy to the filter belt.

18. A filtering system, comprising:
 a chamber having an inlet to a fluid flow pathway;
 a movable filter belt interposed in the fluid flow pathway, wherein the filter belt is configured to trap contaminants while allowing fluid to pass from the inlet along the fluid flow pathway;
 a cleaning device positioned adjacent to the filter belt and comprising a scraper configured to lift contaminants from the filter belt as the filter belt moves; and,
 a spring coupled to the cleaning device and configured to provide a compression force on the scraper to press the scraper in consistent pressured contact with the filter belt as the filter belt moves.

19. The filtering system of claim 18 wherein the cleaning device comprises a first cleaning device, and wherein the system further includes a second cleaning device downstream of the first cleaning device.

20. The filtering system of claim 19 wherein the second cleaning device comprises a water sprayer.

21. The filtering system of claim 20 wherein the water sprayer is configured to deliver periodic water spray to the filter belt.

22. The filtering system of claim 20 wherein the water sprayer is configured to deliver continuous water spray to the filter belt.

23. The filtering system of claim 18 wherein the filter belt is configured to trap fat, oil, and grease.

* * * * *